United States Patent
Kim

(10) Patent No.: US 11,016,704 B2
(45) Date of Patent: May 25, 2021

(54) SEMICONDUCTOR SYSTEM INCLUDING VARIOUS MEMORY DEVICES CAPABLE OF PROCESSING DATA

(71) Applicant: SK hynix Inc., Gyeonggi-do (KR)

(72) Inventor: Eui Seok Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 9 days.

(21) Appl. No.: 16/411,363

(22) Filed: May 14, 2019

(65) Prior Publication Data

US 2019/0354315 A1    Nov. 21, 2019

(30) Foreign Application Priority Data

May 17, 2018    (KR) .......................... 10-2018-0056379

(51) Int. Cl.
*G06F 3/06*    (2006.01)

(52) U.S. Cl.
CPC .......... *G06F 3/0659* (2013.01); *G06F 3/0611* (2013.01); *G06F 3/0653* (2013.01); *G06F 3/0673* (2013.01)

(58) Field of Classification Search
CPC .... G06F 3/0659; G06F 3/0673; G06F 3/0653; G06F 3/0611; G06F 3/061; G06F 3/0635; G06F 3/0685; G06F 13/18; G06F 13/1668
See application file for complete search history.

(56) References Cited

U.S. PATENT DOCUMENTS

| | | | |
|---|---|---|---|
| 9,190,124 B2 | 11/2015 | Fanning et al. | |
| 9,378,142 B2 | 6/2016 | Ramanujan et al. | |
| 10,126,981 B1* | 11/2018 | Malina | G06F 3/0685 |
| 2012/0072652 A1* | 3/2012 | Celis | G06F 12/0893 |
| | | | 711/103 |
| 2014/0101370 A1* | 4/2014 | Chu | G06F 12/0238 |
| | | | 711/103 |
| 2017/0322747 A1* | 11/2017 | Kumano | G06F 3/0659 |
| 2018/0197918 A1* | 7/2018 | Bertin | H01L 27/2409 |
| 2018/0285012 A1* | 10/2018 | Kazama | G06F 3/0652 |

* cited by examiner

*Primary Examiner* — Hiep T Nguyen
(74) *Attorney, Agent, or Firm* — IP & T Group LLP

(57) ABSTRACT

A semiconductor system may include a processor, a storage, a first memory apparatus and a second memory apparatus. The storage stores data by communicating with the processor. The first memory apparatus receives and stores data corresponding to a first workload and data corresponding to a second workload from the storage, and performs a first processing operation on the first workload, according to a request of the processor. The second memory apparatus receives the data corresponding to the second workload from the first memory apparatus, and performs a second processing operation on the second workload, according to a request of the processor.

16 Claims, 3 Drawing Sheets

SEMICONDUCTOR SYSTEM INCLUDING VARIOUS MEMORY DEVICES CAPABLE OF PROCESSING DATA

CROSS-REFERENCE TO RELATED APPLICATION

The present application claims priority under 35 U.S.C. 119(a) to Korean application number 10-2018-0056379, filed on May 17, 2018, in the Korean Intellectual Property Office, the entire disclosure of which is incorporated herein by reference.

BACKGROUND

1. Technical Field

Various embodiments of the present disclosure generally relate to an integrated circuit technology. Particularly, the embodiments relate to a semiconductor system including various memory apparatuses.

2. Related Art

An electronic device includes many electronic components, and a computer system includes various semiconductor systems comprising a semiconductor. A semiconductor system may include a processor configured to serve as a host, a memory apparatus configured to serve as a cache or a buffer memory, and a storage configured to store and output a great amount of data. As semiconductor technology develops, difference in performance between the processor and the other elements becomes is increasing. A poor performance of a component limits the performance of the overall semiconductor system.

Recently, various memory apparatuses and storages have been developed to improve the performance of the components. One of the memory apparatuses and storages that have been developed is a NAND storage or a solid state drive (SSD) configured to rapidly store and output a great amount of data. Another one of the memory apparatuses and storages that have been developed is a storage class memory (SCM) including a nonvolatile memory apparatus configured to store a great amount of data while storing and outputting data with a high speed comparable to that of the random access memory (RAM). The SSD and the storage class memory contribute to the improvement of the semiconductor system.

SUMMARY

In accordance with a present disclosure, a semiconductor system may include a processor, a storage, a first memory apparatus, and a second memory apparatus. The storage may be configured to store data by communicating with the processor. The first memory apparatus may be configured to receive and store a first workload and a second workload from the storage, and perform a first processing operation on the first workload, according to a request of the processor. The second memory apparatus may be configured to receive the second workload from the first memory apparatus, and perform a second processing operation on the second workload, according to a request of the processor.

In accordance with a present disclosure, an operating method of a semiconductor system may include receiving and storing, by a first memory apparatus, a first workload and a second workload from a storage in order to perform a processing operation on the first workload and the second workload. The operating method may include receiving, by a second memory apparatus, the second workload from the first memory apparatus, and performing a second processing operation on the second workload. The operating method may further include performing, by the first memory apparatus, a first processing operation on the first workload.

In accordance with a present disclosure, a semiconductor system includes a storage class memory circuit, a stacked volatile memory circuit, and a processor. The storage class memory circuit may be configured to load thereon a first workload and a second workload, to provide the stacked volatile memory circuit with the second workload and to perform a first processing operation on the first workload. The stacked volatile memory circuit may be configured to perform a second processing operation on second workload. The processor may be configured to respectively provide the storage class memory circuit and the stacked volatile memory circuit with first and second commands for the first and second processing operations and to perform an operation on results of the first and second processing operations in response to an external request. The storage class memory circuit may provide the second workload with a higher priority over the first processing operation.

DETAILED DESCRIPTION

Figure 1:
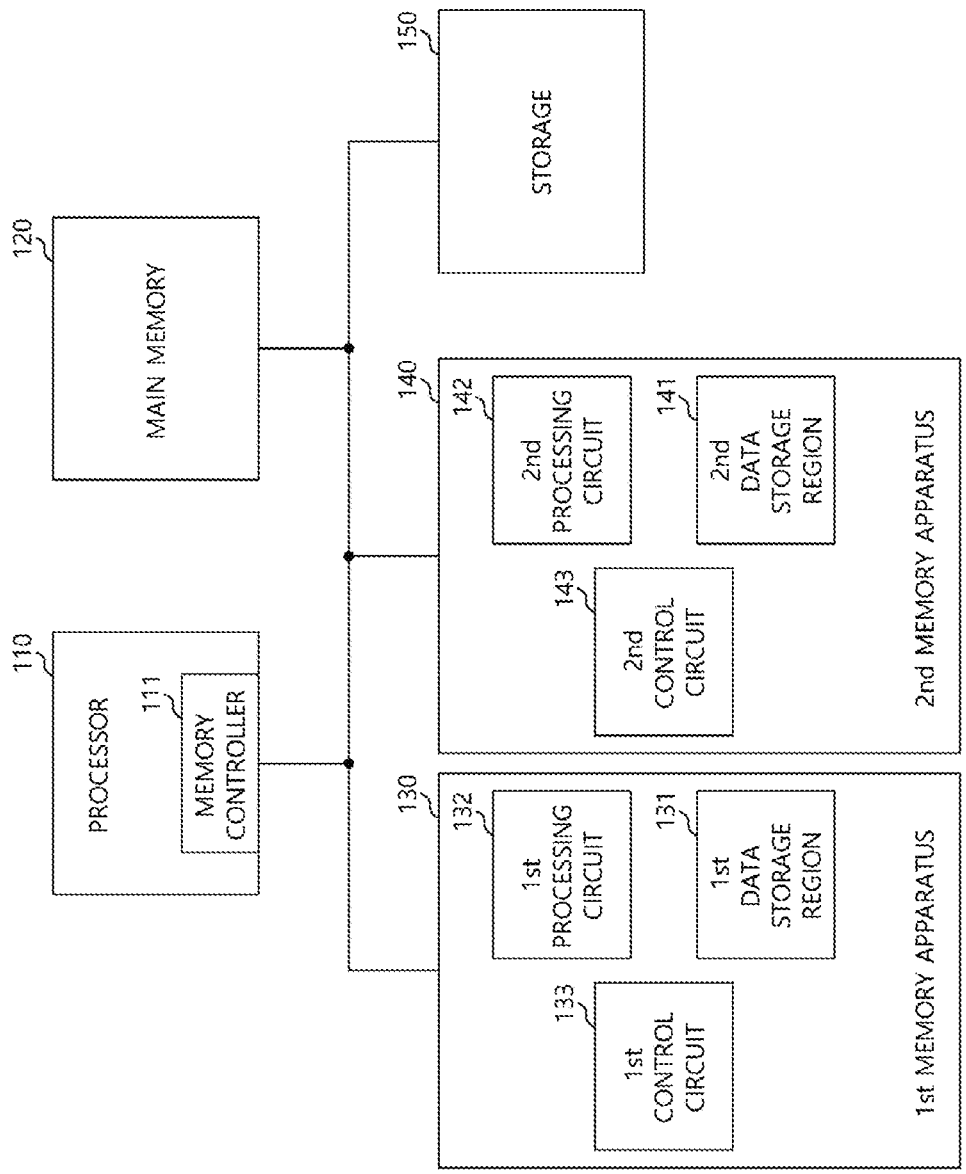
FIG. 1 is a diagram illustrating a configuration of a semiconductor system in accordance with an embodiment of the present disclosure.

The technical spirit of the present disclosure may be changed in various manners, and may be implemented as embodiments having various aspects. Hereinafter, the present disclosure will be described by way of some embodiments so that those skilled in the art can easily practice the embodiments of the present disclosure. It is noted that reference to "an embodiment" does not necessarily mean only one embodiment, and different references to "an embodiment" are not necessarily to the same embodiment(s).

It will be understood that, although the terms "first" and/or "second" may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening to elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

The above-described exemplary embodiments are merely for the purpose of understanding the technical spirit of the present disclosure and the scope of the present disclosure should not be limited to the above-described exemplary embodiments. It will be obvious to those skilled in the art to which the present disclosure pertains that other modifications based on the technical spirit of the present disclosure may be made in addition to the above-described exemplary embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

Hereinafter, a semiconductor apparatus according to the present disclosure will be described below with reference to the accompanying drawings through exemplary embodiments.

FIG. 1 is a diagram illustrating a configuration of a semiconductor system 1 in accordance with an embodiment of the present disclosure.

The semiconductor system 1 may include various memory apparatuses of a hierarchical memory structure thereby optimizing the operation efficiency thereof. The various memory apparatuses may have various speeds of data storage and data output, data storage capacities and bandwidths.

Referring to FIG. 1, the semiconductor system 1 may include a processor 110, a main memory 120, a first memory apparatus 130, a second memory apparatus 140 and a storage 150.

The processor 110 may serve as a host of the semiconductor system 1, and may be configured to provide various control signals required to operate the main memory 120, the first memory apparatus 130, the second memory apparatus 140 and the storage 150. The various control signals provided from the processor 110 may be transmitted as requests to the main memory 120, the first memory apparatus 130, the second memory apparatus 140 and the storage 150. By way of example and not limitation, the processor 110 may include a central processing unit (CPU), a graphic processing unit (GPU), a multi-media processor (MMP), a digital signal processor, an application processor (AP) and so forth.

The main memory 120, the first memory apparatus 130 and the second memory apparatus 140 may serve as working memories, and may operate as buffer memories. The main memory 120 may serve as a cache of the processor 110. By way of example and not limitation, the main memory 120 may include the random access memory such as the static RAM (SRAM), the dynamic RAM (DARM), the synchronous DRAM (SDRAM) and so forth. The main memory 120 may be implemented as a module such as the dual in-line memory module (DIMM).

The first memory apparatus 130 and the second memory apparatus 140 may perform a processing operation together with the processor 110. When the processor 110 performs a MapReduce program as a single processing operation, the processor 110, the first memory apparatus 130 and the second memory apparatus 140 may perform respective parts of the single processing operation. The MapReduce program may include a map function and a reduce function. For example, the first memory apparatus 130 and the second memory apparatus 140 may perform processing operations corresponding to a map function, and the processor 110 may perform, on the results of the processing operations of the first memory apparatus 130 and the second memory apparatus 140, a processing operation corresponding to the reduce function. The map function and the reduce function may be user defined functions. For example, map operations may be processing operations for filtering or changing data into other values. A reduce operation may be a processing operation of grouping or aggregating the results of the map operations.

When a program requiring a particular processing operation is executed, the particular processing operation may be performed through processing operations according to the map function and the reduce function. That is, the particular processing operation may be programmed to be performed through a plurality of map operations and reduce operations. When a single processing operation is performed through a plurality of map operations and reduce operations, it is possible to perform the distributed parallel process to a great amount of data and to drastically reduce the complexity and time of the processing. The map operations performed by the first memory apparatus 130 and the second memory apparatus 140 may be homogeneous or heterogeneous. The processor 110 may perform the reduce operation on the results of the map operations performed by the first memory apparatus 130 and the second memory apparatus 140.

The processor 110 may assign workloads to the first memory apparatus 130 and the second memory apparatus 140 for the particular processing operation by the first and second memory apparatus 130 and 140. The workload may mean target data group assigned to a memory apparatus and processed by the memory apparatus. The processor 110 may assign one workload to the first memory apparatus 130, and assign another workload to the second memory apparatus 140. The first memory apparatus 130 and the second memory apparatus 140 may perform the map operations respectively on the assigned workloads.

The storage 150 may be a mass data storage apparatus. The storage 150 may be the SSD including a plurality of NAND flash memories.

In accordance with an embodiment of the present disclosure, the first memory apparatus 130 may have a higher data storage capacity than the second memory apparatus 140, and the storage 150 may have a higher data storage capacity than the first memory apparatus 130. The first memory apparatus 130 may have a faster operation speed for writing and reading data than that of the storage 150, and the second memory apparatus 140 may have a faster operation speed for writing and reading data. The second memory apparatus 140 may have a wider bandwidth than that of the first memory apparatus 130. The wider bandwidth may mean a higher amount of data inputted or outputted in a unit time.

The first memory apparatus 130 may be a storage class memory (SCM). The first memory apparatus 130 may include a plurality of nonvolatile random access memories. For example, the first memory apparatus 130 may include one or more among the phase change RAM (PRAM), the magnetic RAM (MRAM), the resistive RAM (RRAM), and the ferroelectric RAM (FRAM).

The second memory apparatus 140 may include stacked volatile memory apparatuses. For example, the second memory apparatus 140 may be a 3-dimensional stacked memory apparatus, in which a plurality of DRAMs are stacked. By way of example and not limitation, the second memory apparatus 140 may include the high bandwidth memory (HBM), the hybrid memory cube (HMC) and so forth.

The first memory apparatus 130 and the second memory apparatus 140 may perform processing operations. The first memory apparatus 130 and the second memory apparatus 140 may perform respectively assigned parts of a processing operation, which is to be performed by the processor 110. The first memory apparatus 130 and the second memory apparatus 140 may include processing circuits configured to perform processing operations. The first memory apparatus 130 and the second memory apparatus 140 may be implemented as the "processor in memory" or the "processor near memory". The "processor in memory" or the "processor near memory" may mean that a processing circuit for performing any processing operation is integrated with a memory apparatus as a single chip. When the processor 110 performs a processing operation on a particular workload, the first memory apparatus 130 and the second memory apparatus 140 may perform respective processing operations on a part or all of the particular workload and may transfer the processor 110 with the results of the respective processing operations. The processor 110 may further perform a processing operation on the results of the respective processing operations transferred from the first memory apparatus 130 and the second memory apparatus 140.

Referring to FIG. 1, the first memory apparatus 130 may include a first data storage region 131 and a first processing circuit 132. The first data storage region 131 may store data provided from the storage 150. The first data storage region 131 may store workloads. The workloads may be target data groups that the processor 110 is to perform a processing operation. By way of example, the workloads may include a first work load and a second workload.

The first processing circuit 132 may perform a first processing operation on the first workload. The first processing circuit 132 may perform the first processing operation on the first workload by reading the data corresponding to the first workload among data stored in the first data storage region 131. The first processing circuit 132 may provide, after performing the first processing operation on the first workload, the result of the first processing operation to the processor 110. In an embodiment, the first memory apparatus 130 may read the data, which is stored in the first data storage region 131, corresponding to the first workload according to the fine grain scheme. That is, the first processing circuit 132 may read the data stored in the first data storage region 131 according to the fine grain scheme.

The second memory apparatus 140 may include a second data storage region 141 and a second processing circuit 142. The second memory apparatus 140 may receive the second workload from the first memory apparatus 130, and may store the second workload in the second data storage region 141.

The second processing circuit 142 may perform a second processing operation on the second workload. The second processing to circuit 142 may perform the second processing operation on the second workload by reading the data corresponding to the second workload among data stored in the second data storage region 141. The second processing circuit 142 may provide, after performing the second processing operation on the second workload, the result of the second processing operation to the processor 110.

When the size of the data corresponding to the second workload exceeds the data storage capacity of the second memory apparatus 140, the second memory apparatus 140 may perform the second processing operation by receiving a part of the data corresponding to the second workload from the first memory apparatus 130. For example, the first memory apparatus 130 may first provide the second memory apparatus 140 with a part of the data corresponding to the second workload. The size of the part of the data may correspond to the storage capacity of the second memory apparatus 140. Then, the first memory apparatus 130 may further provide the second memory apparatus 140 with another part of the data corresponding to the second workload after completion of the processing operation on the part of the data corresponding to the second workload. The size of the another part of the data corresponding to the second workload may also correspond to the storage capacity of the second memory apparatus 140. The second memory apparatus 140 may repeat the receiving of the partial data from the first memory apparatus 130 and the performing of the processing operation on the received partial data until completion of the processing operation on the whole data corresponding to the second workload.

In an embodiment, the first memory apparatus 130 may provide the second memory apparatus 140 with the second workload and is stored in the first data storage region 131, according to the coarse grain scheme. That is, the data may be transferred between the first memory apparatus 130 and the second memory apparatus 140 according to the coarse grain scheme.

In an embodiment, the first processing operation and the second processing operation performed respectively by the first memory apparatus 130 and the second memory apparatus 140 may include algorithms that is of similar level. For example, the first processing circuit 132 and the second processing circuit 142 may include algorithms of the similar level of complexity to each other or the same algorithm as each other. In an embodiment, the second processing operation performed by the second memory apparatus 140 may have more complicated algorithm than that of the first processing operation performed by the first memory apparatus 130. The second processing circuit 142 may perform more complicated processing operation than that of the first processing circuit 132, and may include a logic circuit capable of performing the more complicated processing operation.

In an embodiment, the data corresponding to the second workload may be the "big data". The "big data" may refer to great amount of data having the same type.

In accordance with an embodiment of the present disclosure, the semiconductor system 1 may maximize the operation efficiency thereof by controlling memory apparatuses having different characteristics with each other to perform processing operations.

For example, the first memory apparatus 130 may have relatively higher data storage capacity while having relatively narrower bandwidth. In this situation, when the semiconductor system 1 is configured so that only the first memory apparatus 130 performs a processing operation, the performance of processing a workload may be limited. On the contrary, the second memory apparatus 140 may have relatively broader bandwidth while having relatively lower data storage capacity. In this situation, when the semiconductor system 1 is configured so that only the second memory apparatus 140 performs a processing operation, a great amount of data may not be efficiently processed. That is, when the workload has a great size, the second memory apparatus 140 should frequently receive data from the storage 150. Therefore, in accordance with an embodiment of the present disclosure, the semiconductor system 1 may use both the first memory apparatus 130 and the second memory apparatus 140, each of which may be implemented as the "processor in memory" or the "processor near memory".

Referring to FIG. 1, the processor 110 may include a memory controller 111. The memory controller 111 may convert variable requests of the processor 110 to variable commands provided to the first memory apparatus 130, the second memory apparatus 140, and the storage 150. The memory controller 111 may schedule the variable requests of the processor 110. For example, the memory controller 111 may provide a read command to the storage 150 and a write command to the first memory apparatus 130. The memory controller 111 may receive data outputted from the storage 150, and transmit the data to the first memory apparatus 130. The memory controller 111 may provide a read command to the first memory apparatus 130 and a write command to the second memory apparatus 140. The memory controller 111 may receive data outputted from the first memory apparatus 130, and transmit the data to the second memory apparatus 140. The memory controller 111 may provide read commands to the first and second memory apparatus 130 and 140, and allow the processor 110 to receive data outputted from the first and second memory apparatuses 130 and 140.

The first memory apparatus 130 may further include a first control circuit 133. The first control circuit 133 may receive data outputted from the first data storage region 131 to the first processing circuit 132, and output the processed data by the first processing circuit 132 to the processor 110. Also, the first control circuit 133 may arbitrate between an access to the first data storage region 131 from the processor 110 and an access to the first data storage region 131 from the first processing circuit 132. The second memory apparatus 140 may further include a second control circuit 143. The second control circuit 143 may receive data outputted from the second data storage region 141 to the second processing circuit 142, and output the processed data by the second processing circuit 142 to the processor 110. Also, the second control circuit 143 may arbitrate between an access to the second data storage region 141 from the processor 110 and an access to the second data storage region 141 from the second processing circuit 142.

Figure 2:
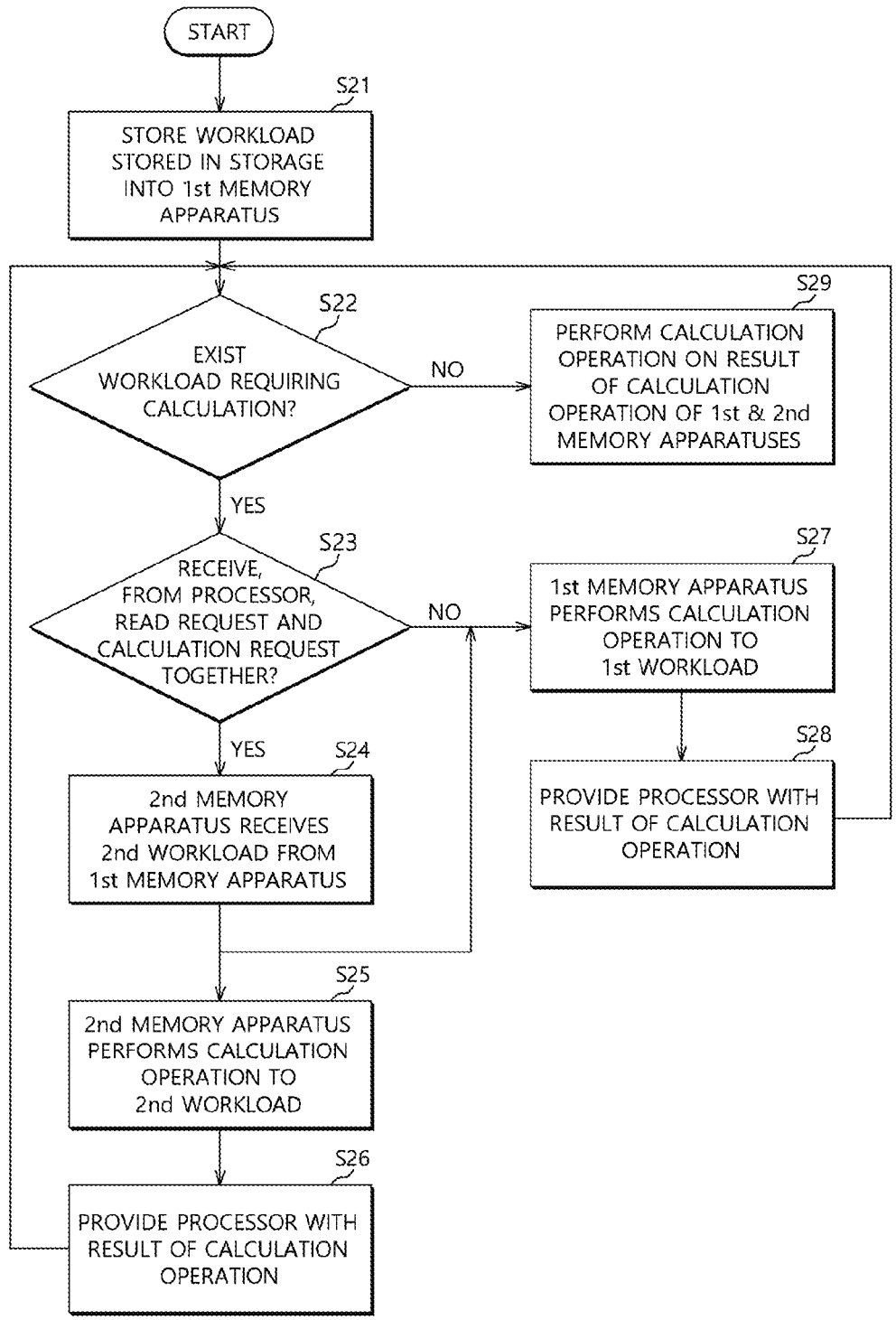
FIG. 2 is a flowchart illustrating an operation of a semiconductor system in accordance with an embodiment of the present disclosure.

FIG. 2 is a flowchart illustrating an operation of the semiconductor system 1 in accordance with an embodiment of the present disclosure. Hereinafter, an operating method of the semiconductor system 1 will be described with references to FIGS. 1 and 2.

In order to perform a processing operation on a particular workload, the processor 110 may provide an access request to the storage 150, the first memory apparatus 130 and the second memory apparatus 140. The processor 110 may provide the storage 150 with a read request and provide the first memory apparatus 130 with a write request.

In step S21, the storage 150 may output data corresponding to the particular workload to the first memory apparatus 130 according to the read request provided from the processor 110, and the first memory apparatus 130 may receive the data corresponding to the particular workload from the storage 150 and store the received data into the first data storage region 131 according to the write request provided from the processor 110.

In step S22, the processor 110 may determine whether there is a workload requiring a processing among workloads stored in the first data storage region 131. When there is a workload requiring a processing among workloads stored in the first data storage region 131 (that is, "YES" at step S22), the processor 110 may provide the first memory apparatus 130 and the second memory apparatus 140 with an access request. The processor 110 may provide a read request and a processing request to the first memory apparatus 130 and may provide a write request and a processing request to the second memory apparatus 140.

In step S23, the first memory apparatus 130 may determine whether the read request and the processing request are provided together from the processor 110. The first memory apparatus 130 may preferentially respond to the read request prior to the processing request. That is, the first memory apparatus 130 may preferentially output, to the second memory apparatus 140, data corresponding to the second workload among data stored in the first data storage region 131 in response to the read request prior to the performing of the first processing operation in response to the processing request.

In step S24, when the first memory apparatus 130 receives the read request and the processing request together from the processor 110 (that is, "YES" at step S23), the second memory apparatus 140 may store the data, which is provided from the first memory apparatus 130, into the second data storage region 141 in response to the write request provided from the processor 110.

In step S25, the second memory apparatus 140 may read data stored in the second data storage region 141 and may perform the second processing operation on the second workload, according to the processing request provided from the processor 110.

In step S26, the second memory apparatus 140 may provide, when the second processing operation is completed, the result of the second processing operation to the processor 110.

After providing the result of the processing operation to the processor, it may be determined again whether there is a workload requiring a processing among workloads stored in the first data storage region 131 in step S22, and steps S23 to S26 may be repeated when there is a workload requiring a processing among workloads stored in the first data storage region 131 and when the first memory apparatus 130 receives the read request and the processing request together from the processor 110.

In step S27, when the first memory apparatus 130 receives only the processing request from the processor 110 without receiving the read request (that is, "NO" at step S23), the first memory apparatus 130 may read the data corresponding to the first workload among the data stored in the first data storage region 131 and may perform the first processing operation on the first workload.

Further, the first memory apparatus 130 may perform, after providing the second memory apparatus 140 with the second workload (i.e., after completion of step S24), processing operations with the second memory apparatus 140.

In some embodiments, the processing operations of the first memory apparatus 130 and the second memory apparatus 140 may be performed simultaneously.

In step S28, the first memory apparatus 130 may provide, when the first processing operation is completed, the result of the first processing operation to the processor 110.

After providing the result of the processing operation to the processor, it may be determined again whether there is a workload requiring a processing among workloads stored in the first data storage region 131 in step S22, and steps S27 and S28 may be repeated when there is a workload requiring a processing among workloads stored in the first data storage region 131 and when the first memory apparatus 130 receives only the processing request from the processor 110 without receiving the read request.

In step S29, when processing on the whole data of the workload are completed, i.e., there does not exist workload requiring processing (that is, "NO" at step S22), the processor 110 may perform a processing operation on the results of the processing operations provided from the first memory apparatus 130 and the second memory apparatus 140.

Figure 3:
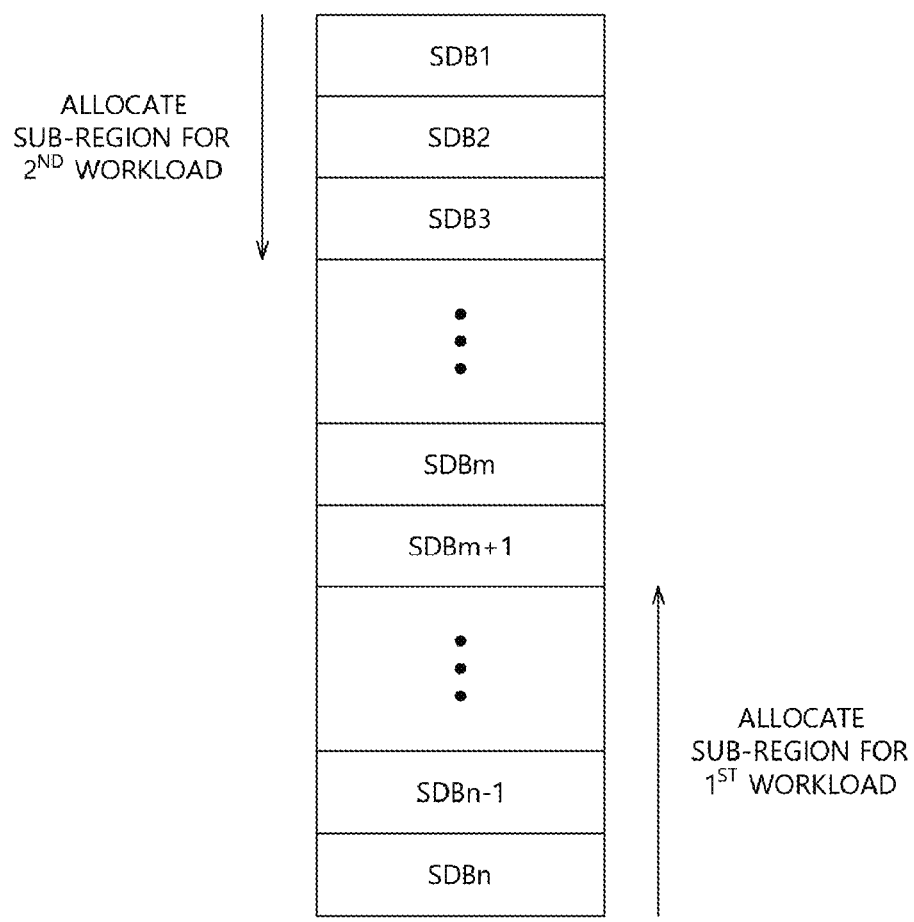
FIG. 3 is a diagram illustrating a configuration of a first data storage region illustrated in FIG. 1.

FIG. 3 is a diagram illustrating a configuration of the first memory apparatus 130 illustrated in FIG. 1.

The first data storage region 131 may be divided into a plurality of sub-regions. The plurality of sub-regions may be data storage regions physically or logically distinct from one another. Referring to FIG. 3, the first data storage region 131 may include first to n-th sub-regions SDB1 to SDBn. The first memory apparatus 130 may store data, which is provided from the storage 150, into the first to n-th sub-regions SDB1 to SDBn.

Different sub-regions may be assigned for the data corresponding to the first workload and the data corresponding to the second workload. That is, the sub-regions assigned for the data corresponding to the first workload may be different from the sub-regions assigned for the data corresponding to the second workload. For example, the data corresponding to the first workload may be stored into the sub-regions in descending order from the sub-region of the highest turn while the data corresponding to the second workload may be stored into the sub-regions in ascending order from the sub-region of the lowest turn. For example, the n-th sub-region SDBn may be assigned first and then the (n−1)th sub-region SDBn−1 may be assigned, for storing the data corresponding to the first workload. On the contrary, the first sub-region SDB1 may be assigned first and then the second sub-region SDB2 and the third sub-region SDB3 may be assigned, for storing the data corresponding to the first workload. For example, the second workload may be stored into the first to m-th sub-regions SDB1 to SDBm while the first workload may be stored into the n-th to m+1-th sub-regions SDBn to SDBm+1. Since the first workload, to which the first memory apparatus 130 performs the processing operation, and the second workload to be provided to the second memory apparatus 140 are stored in different sub-regions, the first memory apparatus 130 may perform a read operation without collision between data corresponding to the first workload and the second workload.

While certain embodiments have been described above, it will be understood to those skilled in the art that the embodiments described are by way of example only. Accordingly, the semiconductor system including various memory devices capable of processing data should not be limited based on the described embodiments. Rather, the semiconductor system including various memory devices capable of processing data described herein should only be limited in light of the claims that follow when taken in conjunction with the above description and accompanying drawings.

What is claimed is:

1. A semiconductor system comprising:
   a processor;
   a storage configured to store data by communicating with the processor;
   a first memory apparatus configured to receive and store a first workload and a second workload from the storage, and perform a first calculation operation on the first workload, according to a request of the processor, wherein the first memory apparatus preferentially performs outputting the second workload to the second memory apparatus prior to the performing of the first calculation operation; and
   a second memory apparatus configured to receive the second workload from the first memory apparatus, and perform a second calculation operation on the second workload, according to a request of the processor.

2. The semiconductor system of claim 1, wherein the first memory apparatus has a faster operation speed than the storage, and the second memory apparatus has a faster operation speed than the first memory apparatus.

3. The semiconductor system of claim 1, wherein the storage has a higher data storage capacity than the first memory apparatus, and the first memory apparatus has a higher data storage capacity than the second memory apparatus.

4. The semiconductor system of claim 1, wherein the second memory apparatus has a wider bandwidth than the first memory apparatus.

5. The semiconductor system of claim 1, wherein the second memory apparatus performs the second calculation operation with more complex algorithm than the first calculation operation.

6. An operating method of a semiconductor system, the method comprising:
   receiving and storing, by a first memory apparatus, first workload and a second workload from a storage for performing a calculation operation on the first workload and the second workload;
   receiving, by a second memory apparatus, data corresponding to the second workload from the first memory apparatus, and performing a second calculation operation on the received data; and
   performing, by the first memory apparatus, a first calculation operation on the first workload.

7. The method of claim 6, wherein the second calculation operation is performed with more complex algorithm than the first calculation operation.

8. The method of claim 6, wherein the first memory apparatus has a faster operation speed than the storage, and the second memory apparatus has a faster operation speed than the first memory apparatus.

9. The method of claim 6, wherein the second memory apparatus has a wider bandwidth than the first memory apparatus.

10. The method of claim 6, wherein the storage has a higher data storage capacity than the first memory apparatus, and the first memory apparatus has a higher data storage capacity than the second memory apparatus.

11. The method of claim 6, wherein the first calculation processing operation is performed, after the second memory apparatus receives the data corresponding to the second workload, simultaneously with the second calculation operation.

12. The method of claim 6, further comprising:
   transferring, respectively by the first memory apparatus and the second memory apparatus, the processor with results of the first calculation operation and the second processing operation; and
   performing, by the processor, a calculation operation on the results of the first calculation operation and the second calculation operation.

13. A semiconductor system comprising:
a stacked volatile memory circuit configured to perform a second calculation operation on a second workload;
a storage class memory circuit configured to load thereon a first workload and the second workload, to provide the stacked volatile memory circuit with the second workload and to perform a first calculation operation on the first workload; and
a processor configured to respectively provide the stacked volatile memory circuit and the storage class memory circuit with first and second commands for the first and second calculation operations and to perform an operation on results of the first and second calculation operations in response to an external request,
wherein the storage class memory circuit provides the second workload with a higher priority over the first calculation operation.

14. A semiconductor system comprising:
a processor;
a storage configured to store data by communicating with the processor;
a first memory apparatus configured to receive a first workload and a second workload from the storage, store the first workload and the second workload to a first storage region, and perform a first calculation operation on the first workload, according to a request of the processor; and
a second memory apparatus configured to receive the second workload from the first memory apparatus, and perform a second calculation operation on the second workload, according to a request of the processor,
wherein the first data storage region includes a plurality of sub-regions, and
wherein the data corresponding to the first workload is stored into the sub-regions in descending order from a sub-region of the highest turn within the plurality of sub-regions, and the data corresponding to the second workload is stored into the sub-regions in ascending order from a sub-region of the lowest turn within the plurality of sub-regions.

15. The semiconductor system of claim 14, wherein the second memory apparatus includes:
a second data storage region configured to store data corresponding to the second workload; and
a second processing circuit configured to perform the second calculation operation on the data corresponding to the second workload.

16. The semiconductor system of claim 14,
wherein the first data storage region includes a plurality of sub-regions, and wherein sub-regions to store the data corresponding to the first workload and sub-regions to store the data corresponding to the second workload are differently assigned among the plurality of sub-regions.

* * * * *